United States Patent [19]
Bonvallet

[11] Patent Number: 5,579,570
[45] Date of Patent: Dec. 3, 1996

[54] APPARATUS FOR PRELOADING PINION BEARING

[75] Inventor: Duane J. Bonvallet, Ann Arbor, Mich.

[73] Assignee: Trio Tool Company, Livonia, Mich.

[21] Appl. No.: 384,116

[22] Filed: Feb. 6, 1995

[51] Int. Cl.⁶ .............................. B21D 53/10; B23P 11/00
[52] U.S. Cl. ........................................... 29/724; 29/898.09
[58] Field of Search .............................. 29/724, 725, 720,
29/898.07, 898.09, 898.05

[56] References Cited

U.S. PATENT DOCUMENTS

| | | | |
|---|---|---|---|
| 3,830,633 | 8/1974 | Harbottle | 29/724 |
| 4,172,621 | 10/1979 | Yoshida | 29/725 |
| 5,159,754 | 11/1992 | Vancsik | 29/898.09 |
| 5,328,269 | 7/1994 | Mutolo et al. | 29/724 |
| 5,386,630 | 2/1995 | Fox | 29/898.09 |
| 5,442,854 | 8/1995 | Koltookian et al. | 29/724 |

Primary Examiner—Irene Cuda
Attorney, Agent, or Firm—C. J. Fildes & Co.

[57] ABSTRACT

An apparatus for preloading a bearing set that supports a pinion shaft in a differential gear assembly includes a low torque drive assembly for rotating the pinion shaft connected to a high torque drive assembly for tightening a pinion nut. A sensor assembly measures the drag torque of the rotating pinion shaft as the pinion shaft nut is being tightened to indicate bearing preload.

9 Claims, 2 Drawing Sheets

APPARATUS FOR PRELOADING PINION BEARING

FIELD OF THE INVENTION

This invention relates to preloading spaced bearing sets and more particularly to controllably preloading a bearing set that supports a pinion shaft in a differential gear assembly as a pinion shaft nut is being tightened.

BACKGROUND OF THE INVENTION

It is known in the art relating to manufacturing axle mounted differential gear assemblies to preload tapered roller bearings that support the pinion shaft. During manufacturing an operation is performed in which a pinion shaft nut is tightened on the pinion shaft to force a universal joint yoke to partially collapse a collapsible sleeve positioned between a pair of spaced tapered roller bearings that support the pinion shaft. Bearing preload is determined by measuring the torque required to rotate the bearings after the pinion shaft nut is tightened.

The torque required to tighten the pinion shaft nut and collapse the sleeve is generally in the range of about 100 lb-ft. The torque required to rotate the bearings at the desired preload is generally less than 10 lb-ft.

To minimize the cycle time to perform the tightening and preloading operation it is desirable to measure the drag torque of the rotating pinion shaft while the pinion shaft nut is being tightened. Subtracting the rotating pinion shaft torque from the pinion shaft nut torque theoretically yields the bearing drag torque but presents the problem of having to subtract two large variables to obtain a small value.

SUMMARY OF THE INVENTION

The present invention provides a method and apparatus for controllably preloading a bearing set that supports a pinion shaft in a differential gear assembly by isolating a high torque operation required to preload the bearing set. According to the invention, a torque required to tighten a pinion shaft nut on the pinion shaft to collapse a collapsible bearing spacer which preloads the bearing set is reacted through a drive assembly for rotating the pinion shaft during pinion shaft nut tightening to allow bearing drag torque which is a function of bearing preload to be reacted to ground and accurately measured. Although the method and apparatus for preloading a bearing set is described with reference to a differential gear assembly, it will become apparent that the method and apparatus can be applied to other bearing sets in other applications.

Accordingly, it is an object of this invention to allow accurate measurement of bearing drag torque during tightening of the pinion shaft nut by connecting together means for pinion shaft nut tightening and concurrent pinion shaft rotation.

A more specific object of the invention is a method for controllably preloading a bearing set that supports a pinion shaft in an axle mounted differential gear assembly. Such a differential gear assembly includes a differential housing, a bearing set including antifriction bearings spaced by a collapsible spacer, a pinion shaft supported by the bearing set and having a driven end extending through the housing, a universal joint yoke mountable on the driven end of the pinion shaft and a pinion shaft nut tightenable on the pinion shaft to move the pinion shaft relative to the universal joint yoke to force the universal joint yoke to collapse the collapsible spacer in order to preload the bearing set that supports the pinion shaft. The method is characterized by the steps of rotating the universal joint yoke/pinion shaft, concurrently tightening the pinion shaft nut on the pinion shaft, reacting the universal joint yoke/pinion shaft rotational torque against the pinion shaft nut tightening torque, measuring the torque required to rotate the universal joint yoke/pinion shaft as the pinion shaft nut is being tightened, and discontinuing tightening of the pinion shaft nut when a preset bearing drag torque is achieved.

Another object of the invention is an apparatus for controllably preloading the bearing set that supports the pinion shaft. The apparatus is characterized by a low torque drive assembly for rotating the yoke/pinion shaft, connected to a high torque drive assembly for tightening the pinion nut. A sensor measures the torque to rotate the yoke/pinion shaft as the pinion shaft nut is being tightened to indicate bearing preload.

These and other features and advantages of the invention will be more fully understood from the following detailed description of the invention taken together with the accompanying drawings.

DETAILED DESCRIPTION OF THE INVENTION

Figure 1:
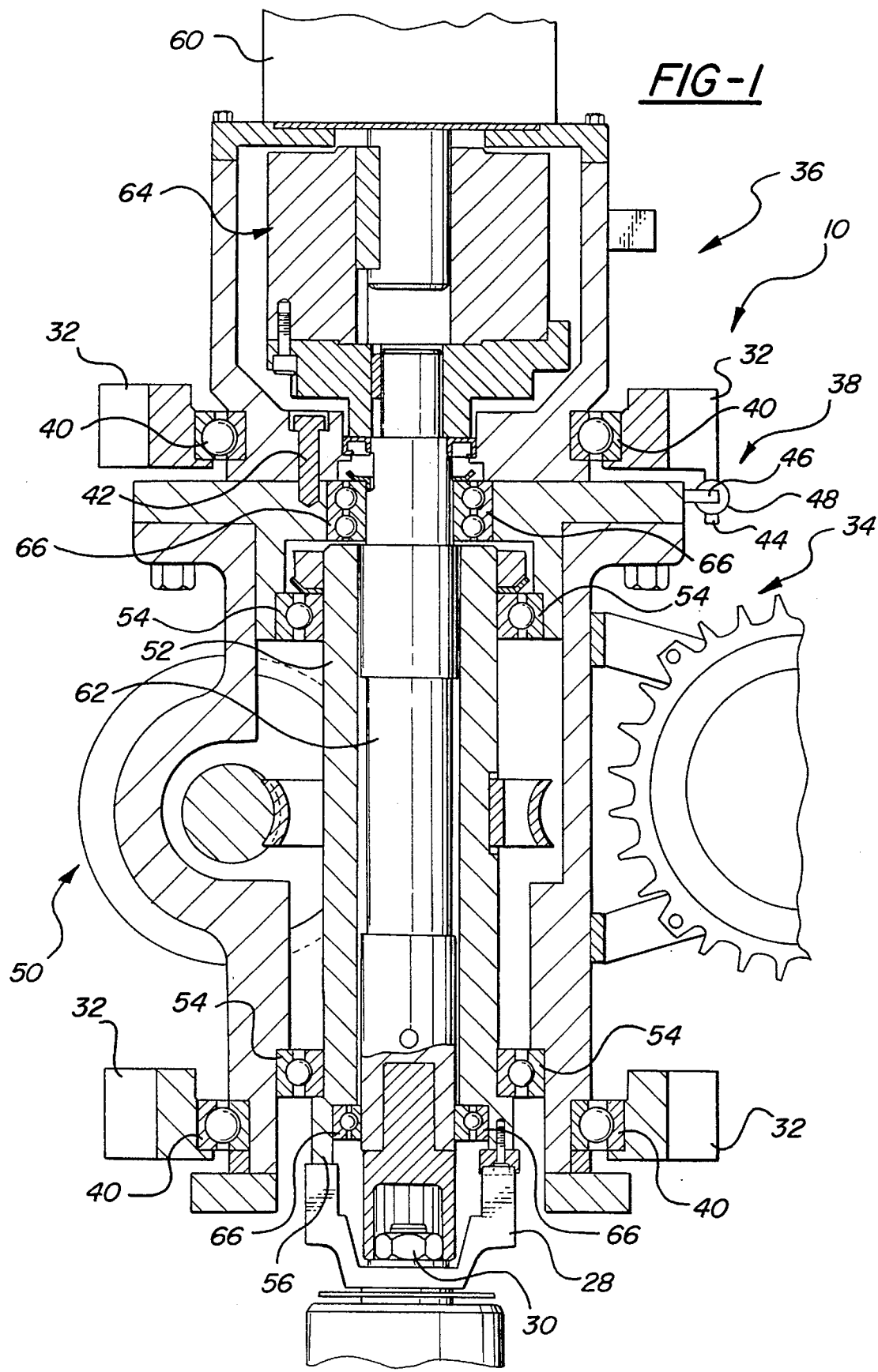
FIG. 1 is a sectional elevational view of an apparatus for preloading a pinion bearing set in a differential gear assembly, constructed in accordance with the present invention.
Figure 2:
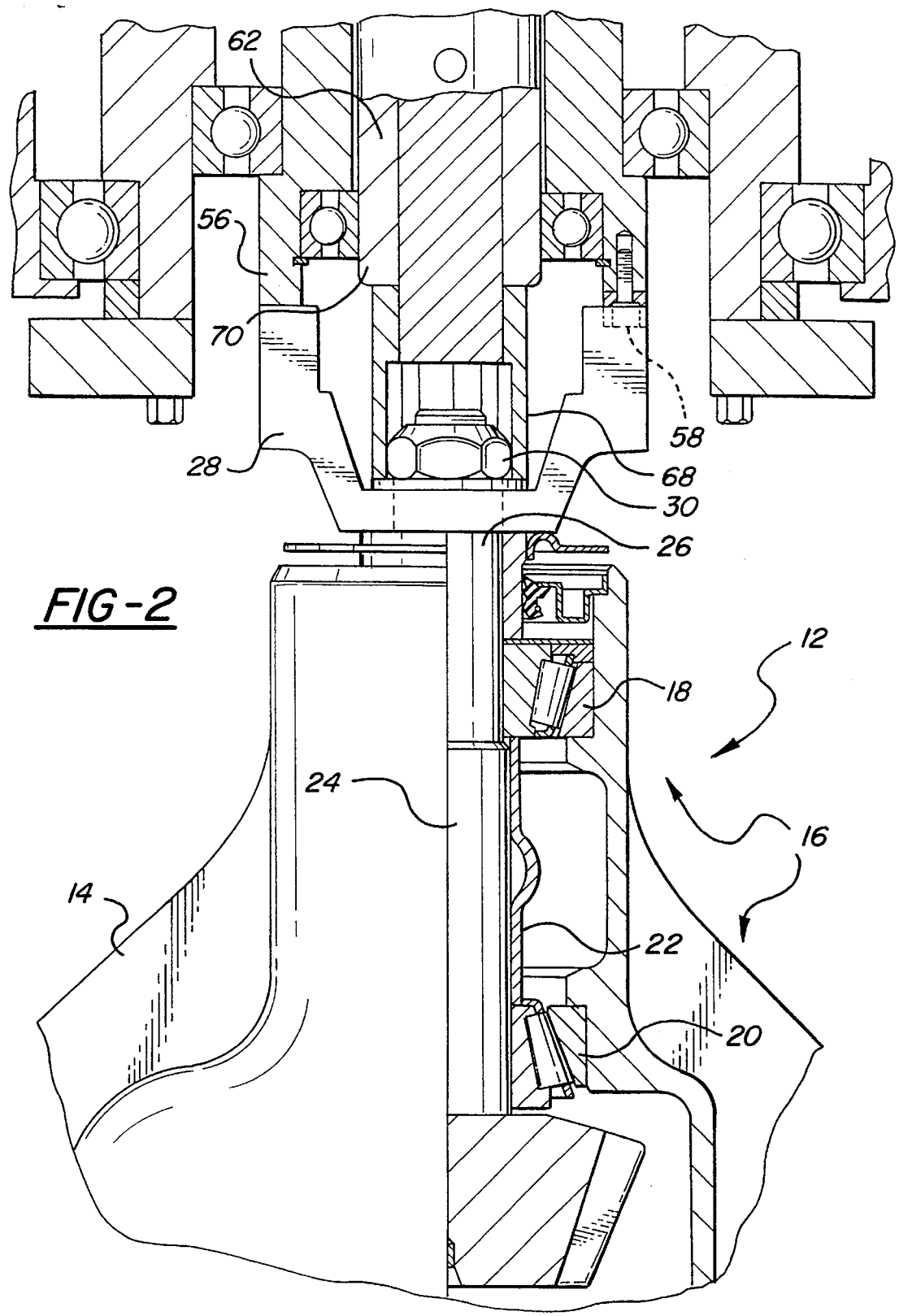
FIG. 2 is an enlarged sectional elevational view of a portion of the preloading apparatus and a portion of a differential gear assembly.

Referring now to the drawings in detail, numeral 10 generally indicates an apparatus for preloading the pinion bearing set of an axle mounted differential gear assembly 12. As is generally known, the differential gear assembly 12 includes a differential housing 14 and a bearing set 16 including a pair of spaced tapered roller bearings 18, 20 separated by a collapsible spacer 22. A pinion shaft 24 is supported for rotation by bearing set 16 and has a driven end 26 extending through the housing 14. A universal joint yoke 28 is mounted on the driven end 26 of the pinion shaft 24 and a pinion shaft nut 30 is tightenable on the pinion shaft 24 to move the pinion shaft in a longitudinal direction relative to the universal joint yoke 28 to force the universal joint yoke to collapse the collapsible spacer 22 in order to preload the bearing set 16 that supports the pinion shaft 24.

Apparatus 10 includes a support 32 mounting a low torque drive assembly 34, with integral high torque drive assembly 36, and a sensor assembly 38. Support 32 defines a base or stationary member and supports the low torque drive assembly 34 through bearings 40, allowing the low torque drive assembly free rotational movement relative to the support 32. The high torque drive assembly 36 is rigidly connected to the low torque drive assembly 34 through fasteners 42 thereby prohibiting independent movement of the high torque drive assembly relative to the low torque drive assembly. The sensor assembly 38 includes a stop 44 mounted on the support 32 and an arm 46 mounted on the low torque drive assembly 34 that restrains the low torque drive assembly 34 from rotation relative to the housing 32. Sensor assembly 38 also includes a force measuring device 48 such as a strain gauge transducer mounted on either the stop 44 or arm 46. As is hereinafter more fully described, rotational urging of the connected low and high torque drive assemblies 34, 36 against the support 32 is sensed by the sensor assembly 38 and is a function of the torque caused by the drag of the bearing set 16.

Low torque drive assembly 34 includes a worm gear drive 50 supported on a yoke drive tube 52. Bearings 54 in worm gear drive 50 engage yoke drive tube 52. Yoke drive tube 52 is driven by the worm gear drive 50 and includes a distal end 56 for butting engagement with the universal joint yoke 28. A member 58 extending from distal end 56 engages the universal joint yoke 28 for rotational movement with the yoke drive tube 52 causing the universal joint yoke 28 to be rotated upon operation of worm gear drive 50. Although other types of driving arrangements can be used to provide the low torque drive used to rotate the universal joint yoke 28 and pinion shaft 24 during pinion nut 30 tightening, the worm gear drive provides non-torque reversing rotation as the high torque drive assembly 36 is operated to tighten the pinion nut.

The high torque drive assembly 36 illustrated includes a two-speed motor 60 in communication with a pinion nut tightening shaft 62. Pinion nut tightening shaft 62 can be connected for torque transmission in any way to motor 60, such as directly or through a gear train as are well known, and is illustrated in an optional connecting manner which includes a one-way clutch assembly 64 of the sprag or roller type. Use of a one-way clutch 64 allows a smaller low torque worm gear drive 50 to be used as the worm gear drive does not have to spin the high torque drive assembly 36 through its gear train.

Pinion nut tightening shaft 62 extends through the worm gear drive 50 and hollow yoke drive tube 52. Bearings 66 support the pinion nut tightening shaft 62 for rotation within and relative to the worm gear drive 50 and yoke drive tube 52. A socket 68 for engaging the pinion nut 30 is mountable on the distal end 70 of the pinion nut tightening shaft 62.

The two speeds at which the motor 60 can be operated include high speed for running the pinion nut 30 down and low speed for use during final torquing. In a preferred embodiment the two-speed motor 60 is a servo motor.

During the pinion nut 30 tightening and bearing set 16 preloading operation, universal joint yoke 28 and pinion shaft 24 are rotated by the operation of the worm gear drive 50. At the same time, the pinion nut 30 is rotated through the operation of the two-speed motor 60, first at high speed to drive the nut down and followed by low speed to tighten the nut. The connection together of the worm gear drive 50 and high torque drive assembly 36 cause the torques of these two sources of torque to be reacted against each other and effectively cancelled out. In other words, the torque of the high torque drive assembly 36 is internally contained within the system including the high torque drive assembly and worm gear drive 50 while the reaction torque of the bearing set 16 is measured by the transducer 48.

The torque that exists between the support 32 and the assembly consisting of the worm gear drive 50 and high torque drive assembly 36 is the external torque caused by the drag of the differential bearings 18, 20 of the bearing set 16. Although the worm gear drive 50 can be operated at any speed, operation of the drive at a constant speed avoids the torques associated with acceleration or deceleration of the inertia of the moving parts.

The external torque is a function of bearing set 16 preload and is measured by the sensor assembly 38 during pinion nut 30 tightening. The drag of the bearing set 16 urges the assembly consisting of the worm gear drive 50 and high torque drive assembly 36 to rotate relative to the support 32. However, the arrangement of the stop 44 and arm 46 prohibits such rotation. Placement of the transducer 48 between stop 44 or arm 46 allows the bearing set 16 drag torque to be measured with great accuracy as a function of the transducer output. When the desired bearing set 16 drag torque is achieved, pinion shaft nut 30 tightening is discontinued.

If bearing set 16 drag torque needs to be measured after pinion nut 30 tightening, the high torque drive assembly 36 is operated to take the load off the worm gear drive 50. The torque provided by the high torque drive assembly 36 to rotate itself is within the assembly of worm gear drive 50 and high torque drive assembly and is not seen by the transducer 48.

Although the invention has been described by reference to a specific embodiment, it should be understood that numerous changes may be made within the spirit and scope of the inventive concepts described. For example, the method and apparatus could be used for preloading the bearing set in a steering gear or other gear device. Accordingly, it is intended that the invention not be limited to the described embodiment, but that it have the full scope defined by the language of the following claims.

What is claimed is:

1. Apparatus for controllably preloading a bearing set that supports a shaft in a mechanism, the mechanism including a housing, the bearing set including antifriction bearings, the shaft supported by the bearing set and having an end extending through the housing, and a shaft nut tightenable on the shaft to preload the bearing set that supports the shaft, the apparatus characterized by:

a low torque drive assembly for rotating the shaft;

a high torque drive assembly for tightening the shaft nut; said high torque drive assembly being connected to the shaft through said low torque drive assembly; and a sensor assembly for measuring the drag torque of the rotating shaft as the shaft nut is being tightened to indicate bearing preload.

2. Apparatus for controllably preloading a bearing set that supports a pinion shaft in a differential gear assembly, the differential gear assembly including a differential housing, the bearing set including antifriction bearings, the pinion shaft supported by the bearing set and having a driven end extending through the housing, a universal joint yoke mountable on the driven end of the pinion shaft and a pinion shaft nut tightenable on the pinion shaft to preload the bearing set that supports the pinion shaft, the apparatus characterized by:

a low torque drive assembly for rotating the yoke/pinion shaft;

a high torque drive assembly for tightening the pinion nut; said high torque drive assembly being connected to the yoke/pinion shaft through said low torque drive assembly; and a sensor assembly for measuring the drag torque of the rotating yoke/pinion shaft as the pinion shaft nut is being tightened to indicate bearing preload.

3. Apparatus as in claim 2 characterized by a support mounting said low torque drive assembly, high torque drive assembly and sensor;

said sensor measuring the rotational torque of said low torque drive assembly relative to said support.

4. Apparatus as in claim 3 wherein said low torque drive is characterized by:

a worm gear drive assembly for non-torque-reversing drive of said low torque drive.

5. Apparatus as in claim 4 wherein said worm gear drive assembly is characterized by a constant rotational speed drive.

6. Apparatus as in claim 3 wherein said high torque drive assembly is characterized by a servo motor.

7. Apparatus as in claim 6 wherein said servo motor is characterized in that it provides two rotational speeds, a high speed for driving the pinion nut down and a low speed for tightening the pinion nut.

8. Apparatus as in claim 7 wherein said servo motor is characterized by an overrunning clutch in the torque flow path between said servo motor and pinion nut.

9. Apparatus as in claim 3 characterized in that said sensor is a transducer.

* * * * *